United States Patent
Chen et al.

(10) Patent No.: US 10,095,064 B2
(45) Date of Patent: Oct. 9, 2018

(54) REFLECTIVE DISPLAY APPARATUS AND METHOD OF FORMING THE SAME

(71) Applicant: Himax Display, Inc., Tainan (TW)

(72) Inventors: Wen-Hsu Chen, Tainan (TW); Yuet-Wing Li, Tainan (TW)

(73) Assignee: HIMAX DISPLAY, INC., Tainan (TW)

( * ) Notice: Subject to any disclaimer, the term of this patent is extended or adjusted under 35 U.S.C. 154(b) by 376 days.

(21) Appl. No.: 14/828,931

(22) Filed: Aug. 18, 2015

(65) Prior Publication Data

US 2017/0052411 A1    Feb. 23, 2017

(51) Int. Cl.
*G02F 1/1335* (2006.01)
*G02F 1/13363* (2006.01)

(52) U.S. Cl.
CPC .. *G02F 1/133636* (2013.01); *G02F 1/133502* (2013.01); *G02F 1/133512* (2013.01); *G02F 1/133553* (2013.01)

(58) Field of Classification Search
CPC ............................................... G02F 1/133553
See application file for complete search history.

(56) References Cited

U.S. PATENT DOCUMENTS

| | | | |
|---|---|---|---|
| 2003/0058385 A1 | 3/2003 | McKnight et al. | |
| 2006/0114371 A1* | 6/2006 | Peterson | G02F 1/133617 349/61 |
| 2006/0215091 A1 | 9/2006 | Muramoto et al. | |
| 2009/0290108 A1* | 11/2009 | Nakagawa | G02B 27/1026 349/118 |
| 2014/0267453 A1* | 9/2014 | Lo | G09G 3/3648 345/690 |

FOREIGN PATENT DOCUMENTS

TW    201222102 A    6/2012

* cited by examiner

*Primary Examiner* — Phu Vu
(74) *Attorney, Agent, or Firm* — Locke Lord LLP; Tim Tingkang Xia, Esq.

(57) ABSTRACT

A reflective display apparatus is provided, which includes a liquid-crystal-on-silicon (LCOS) display module and a compensation layer. The LCOS display module has a liquid crystal layer. The liquid crystal layer includes liquid crystal cells, each having a beta angle ranging from about 9 degrees to about 11 degrees and a twist angle ranging from about 84 degrees to about 88 degrees relative to the beta angle. The compensation layer is disposed on the LCOS display module for compensating retardation of the liquid crystal layer.

16 Claims, 6 Drawing Sheets

REFLECTIVE DISPLAY APPARATUS AND METHOD OF FORMING THE SAME

BACKGROUND

Field of Disclosure

The invention relates to a display apparatus, and more particularly, to a reflective display apparatus and method of forming the reflective display apparatus.

Description of Related Art

Nowadays, various kinds of projective display devices, such as liquid crystal display (LCD) display devices, digital light processing (DLP) display devices and liquid crystal on silicon (LCOS) display devices, are commercially available. Among these display devices, the LCD display devices operate in a transmissive way, while the DLP display devices and the LCOS display devices operate in a reflective way. LCD display devices are the oldest the most popular, and have advantages such as high colour accuracy and low manufacture cost. However, LCD display devices have disadvantages of dead pixels and screen door effect, which degrades display performance. DLP display devices have advantages such as high contrast ratio and immune to color decay. However, DLP display devices are relatively expensive. LCOS display devices involves techniques of the typical LCD panel and complementary metal-oxide semiconductor (CMOS) processes. LCOS display devices can achieve high resolution, high color saturation and accuracy and can be manufactured by semiconductor processes. With such advantages, LCOS display devices are applied in electronic devices such as micro-projectors, monitors or head mounted displays.

SUMMARY

The invention provides a reflective display apparatus that improves high contrast performance and a method of forming the reflective display apparatus.

An aspect of the invention is to provide a reflective display apparatus. The reflective display apparatus includes a liquid-crystal-on-silicon (LCOS) display module and a compensation layer. The LCOS display module has a liquid crystal layer. The liquid crystal layer includes liquid crystal cells, each having a beta angle ranging from about 9 degrees to about 11 degrees and a twist angle ranging from about 84 degrees to about 88 degrees relative to the beta angle. The compensation layer on the LCOS display module for compensating retardation of the liquid crystal layer.

In one or more embodiments, the compensation layer includes compensation films stacked on each other.

In one or more embodiments, the number of the compensation films is 2. One of the compensation films has a slow axis of between about 0 and about 30 degrees, and the other of the compensation films has a slow axis of between about 90 degrees and about 120 degrees.

In one or more embodiments, the compensation layer includes a single compensation film.

In one or more embodiments, the compensation layer includes a black matrix.

In one or more embodiments, the compensation layer has a retardation of between about 25 nm and about 140 nm.

In one or more embodiments, the retardation of the liquid crystal layer is between about 240 nm and about 250 nm.

In one or more embodiments, the liquid crystal cells are mixed-type twisted nematic (MTN) liquid crystal cells.

In one or more embodiments, the reflective display apparatus further includes an anti-reflection layer on the compensation layer.

In one or more embodiments, the reflective display apparatus further includes a transparent substrate between the anti-reflection layer and the compensation layer.

In one or more embodiments, the transparent substrate includes a black matrix.

Another aspect of the invention is to provide a method of forming a reflective display apparatus. The method includes providing a LCOS display module having a liquid crystal layer, in which the liquid crystal layer includes liquid crystal cells each having a beta angle ranging from about 9 degrees to about 11 degrees and a twist angle ranging from about 84 degrees to about 88 degrees relative to the beta angle; and disposing a compensation layer on the LCOS display module for compensating retardation of the liquid crystal layer.

In one or more embodiments, the compensation layer includes compensation films stacked on each other.

In one or more embodiments, the number of the compensation films is 2. One of the compensation films has a slow axis of between about 0 and about 30 degrees, and the other of the compensation films has a slow axis of between about 90 degrees and about 120 degrees.

In one or more embodiments, the compensation layer includes a single compensation film.

In one or more embodiments, the compensation layer is disposed on the LCOS display module via an adhesive layer disposed therebetween.

In one or more embodiments, the compensation layer includes a black matrix.

In one or more embodiments, the method further includes disposing an anti-reflection layer on the compensation layer, in which the anti-reflection layer is disposed on the compensation layer via an adhesive layer disposed therebetween.

In one or more embodiments, the method further includes disposing a transparent substrate and an anti-reflection layer sequentially on the compensation layer, in which the transparent substrate is disposed on the compensation layer via an adhesive layer disposed therebetween.

In one or more embodiments, the transparent substrate includes a black matrix.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, the disclosure will be explained with reference to embodiments thereof. However, these embodiments are not intended to limit the disclosure to any specific environment, applications or particular implementations described in these embodiments. Therefore, the description of these embodiments is only for the purpose of illustration rather than to limit the disclosure. In the following embodiments and attached drawings, elements not directly related to the disclosure are omitted from depiction; and the dimensional relationships among individual elements in the attached drawings are illustrated only for ease of understanding, but not to limit the actual scale.

It will be understood that, although the terms "first" and "second" may be used herein to describe various elements, components, regions, layers and/or sections, these elements, components, regions, layers and/or sections should not be limited by these terms. These terms are only used to distinguish one element, component, region, layer or section from another.

Figure 1:
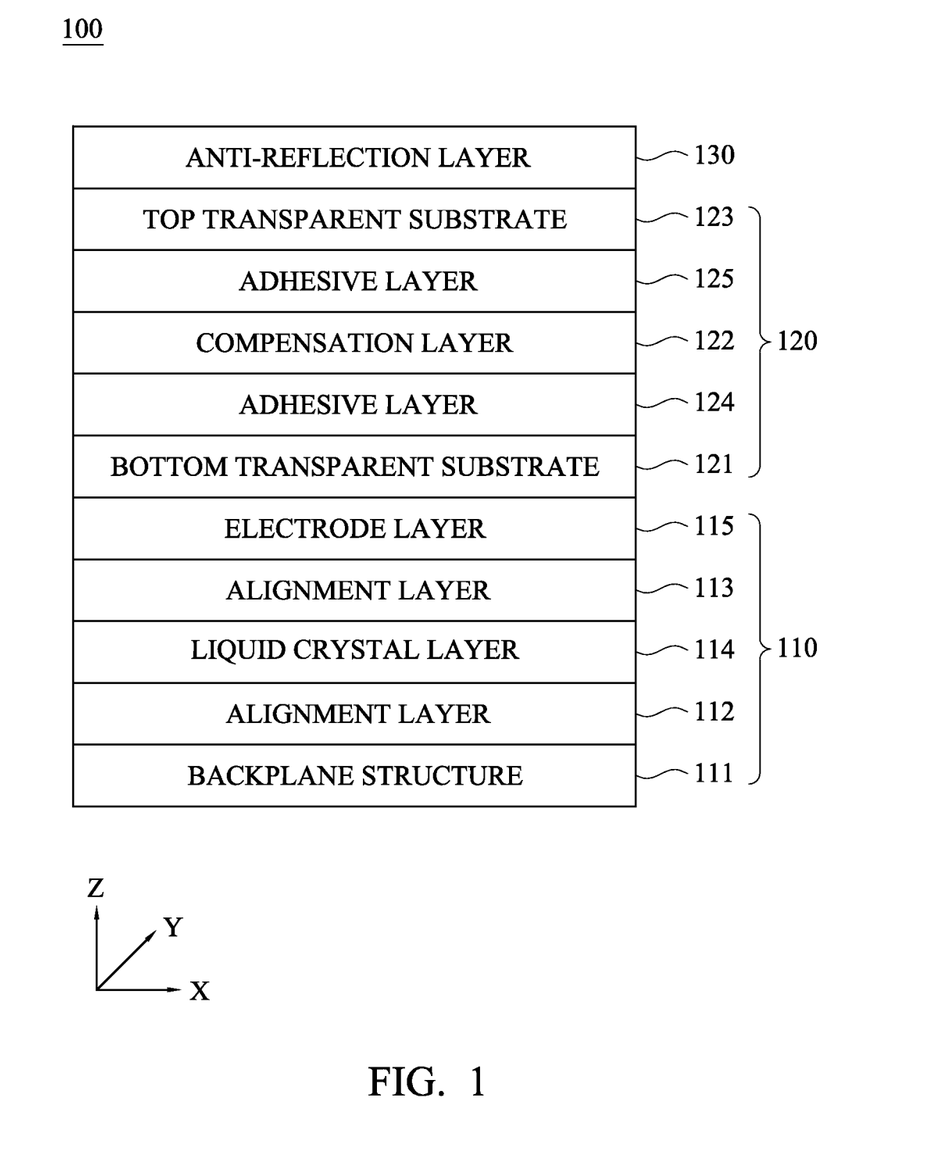
FIG. 1 is a cross-sectional view of a reflective display apparatus in accordance with some embodiments of the invention.

FIG. 1 illustrates a cross-sectional view of a reflective display apparatus 100 in accordance with some embodiments of the invention. The reflective display apparatus 100 is a LCOS display apparatus, which can be practiced by wafer-level manufacturing and includes a LCOS display module 110 and a compensation structure 120. An anti-reflection layer 130 is disposed on the compensation structure 120 for reducing reflection of light.

The LCOS display module 110 includes a backplane structure 111, alignment layers 112, 113, a liquid crystal layer 114 and a transparent electrode layer 115. The backplane structure 111 has pixels arranged in a matrix. Each pixel may correspond to a specific color. In some embodiments, the pixels include red pixels, blue pixels and green pixels. The red pixels, blue pixels and green pixels are sometimes referred to as sub-pixels. Three sub-pixels, which are respectively a red pixel, a blue pixel and a green pixel, form a full pixel for emitting light containing red, blue and green components with respective gray scales. For illustration, the backplane structure 111 further includes a reflective layer for reflecting light incident into the LCOS display module 110 and pixel electrodes for providing pixel voltages to all pixels.

The alignment layer 112 is disposed on the backplane structure 111, the alignment layer 113 is disposed opposite to the first alignment layer 112, and the liquid crystal layer 114 is disposed between the alignment layers 112 and 113. The liquid crystal layer 114 has liquid crystal cells aligned by the alignment layers 112, 113 and twisted in response to an electric field generated between the pixel electrodes in the backplane structure 111 and the common electrode layer 115 disposed on the alignment layer 113. The liquid crystal cells of the liquid crystal layer 114 are mixed-type twisted nematic (MTN) liquid crystal cells. In some embodiments, the retardation of the liquid crystal layer 114 is between about 240 nm and about 250 nm. The alignment layers 112 and 113 may be formed have respective rubbing directions. The electrode layer 115 is disposed on the alignment layer 113 and is configured to providing a common voltage for the pixels of the to display with respective gray levels based on the respective pixel voltages. The electrode layer 115 includes a transparent and conductive material such as indium tin oxide (ITO), indium zinc oxide (IZO), or other suitable material.

The compensation structure 120 includes a bottom transparent substrate 121, a compensation layer 122, a top transparent substrate 123 and adhesive layers 124, 125. The bottom transparent substrate 121 is disposed on the common electrode layer 115 for receiving incident light and protecting the components of the LCOS display module 110. In some embodiments, the bottom transparent substrate 121 includes a transparent material such as glass, silicon dioxide, or the like.

The compensation layer 122 is disposed between the bottom transparent substrate 121 and the top transparent substrate 123 for compensating retardation of the liquid crystal layer 114 and improving the viewing angle of the reflective display apparatus 100. In some embodiments, the compensation layer 122 includes two compensation films. The two compensation films may be two a-plates of which the optical axis direction is parallel to a plane direction of the LCOS display module 110, and may have different optical characteristics as will be described below. Alternatively, the compensation layer 122 may include a single compensation film or more than two compensation films stacked on each other. The adhesive layer 124 is disposed between the bottom transparent substrate 121 and the compensation layer 122, and the adhesive layer 125 is disposed between the compensation layer 122 and the top transparent substrate 123, for adhering the compensation layer 122. The bottom transparent substrate 121 and the top transparent substrate 123 may have the same refractive index, and may be formed of the same material. For example, the bottom transparent substrate 121 and the top transparent substrate 123 may have a refractive index of 1.51, and may be formed of a transparent material such as glass, resin, or the like. The adhesive layers 124 and 125 may include a transparent and adhesive material such as optical glue, double sided tape, or the like. In some embodiments, the top transparent substrate 123 includes a black matrix disposed thereon for shielding light. Alternatively, the black matrix may be disposed on the compensation layer 122.

TABLE 1 lists optical characteristics of the compensation layer 122 in accordance with some embodiments, where Film 1 represents a first compensation film stacked on the adhesive layer 124 and Film 2 represents a second compensation film stacked on the first compensation film. According to TABLE 1, the angle of the slow axis of the first compensation film relative to the X-axis is between 0 degree and 30 degrees, and an angle of the slow axis of the second compensation film relative to the X-axis is between 90 degrees and 120 degrees. Moreover, phase retardations of the first compensation film and the second compensation film are between 25 nm and 140 nm. In other words, a phase retardation of the stacked compensation film layer 144 is in a retardation range of 25 nm to 140 nm.

The angles of the slow axes thereof relative to the X-axis are correspondingly determined when the phase retardations of the first compensation film and the second compensation film are selected. In the embodiment, the phase retardations of the first compensation film and the second compensation film are substantially the same, and the difference between the angle of the slow axis of the first compensation film relative to the X-axis and the angle of the slow axis of the second compensation film relative to the X-axis is substantially 90 degrees.

TABLE 1

|  | Film 1 | | Film 2 | |
| --- | --- | --- | --- | --- |
|  | Minimum | Maximum | Minimum | Maximum |
| Retardation (nm) | 25 | 140 | 25 | 140 |
| Slow axis (°) | 0 | 30 | 90 | 120 |

TABLE 2 lists optical characteristics of the liquid crystal layer 114 in accordance with some embodiments. According to TABLE 2, the phase retardation of the liquid crystal layer 114 is in the range of between 240 nm and 250 nm, the beta angle of the liquid crystal layer 114 relative to the X-axis is in the range of between −11 degrees and −9 degrees, and the twist angle of the liquid crystal layer 114 relative to the beta angle is in the range of between 84 degrees and 88 degrees. In the present embodiment, the beta angle and the twist angle of the liquid crystal layer 114 are correspondingly determined when the phase retardation of the liquid crystal layer 114 is selected.

TABLE 2

|  | Minimum | Maximum |
| --- | --- | --- |
| Twist angle (°) | 84 | 88 |
| Beta angle (°) | −11 | −9 |
| Retardation (nm) | 240 | 250 |

Figure 2:
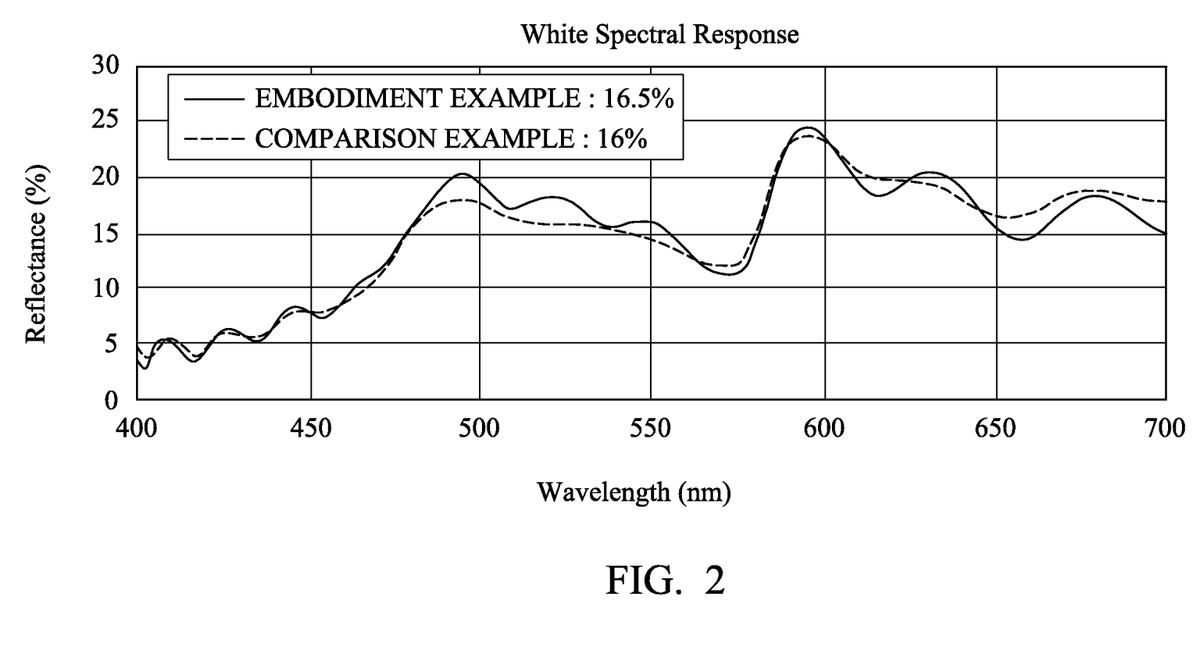
FIG. 2 is a line graph showing the white spectral response of the embodiment example versus the comparison example.
Figure 3:
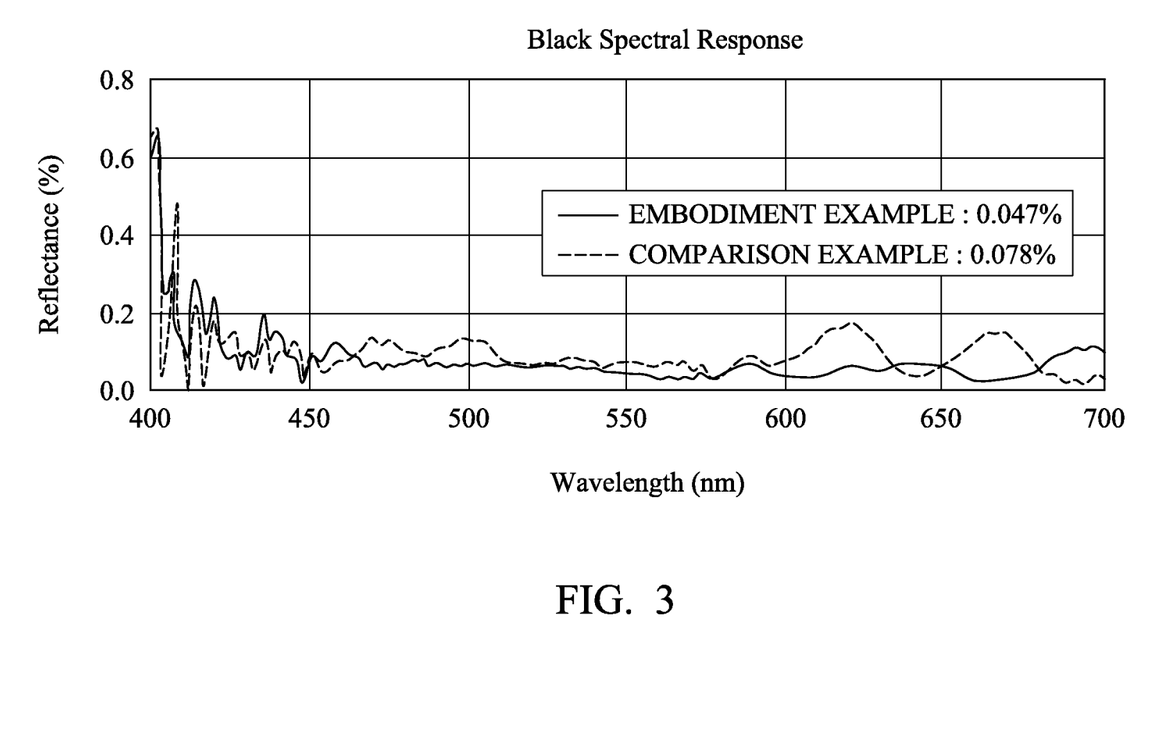
FIG. 3 is a line graph showing the black spectral response of the embodiment example versus the comparison example.

FIGS. 2 and 3 are line graphs showing white and black spectral responses of an embodiment example versus an comparison example. The embodiment example represents the reflective display apparatus 100 with two compensation films, of which the optical characteristics are as listed in TABLE 1, and the comparison example represents a reflective display apparatus of MTN-90 without compensation layer. In FIGS. 2 and 3, the horizontal axis represents wavelengths of incident light, and the vertical axis represents reflectance of the reflective display apparatus of the embodiment example and the comparison example. The operation voltage is 6.5 volts for the embodiment example and the comparison example.

As shown FIG. 2, for white spectral response, the reflectance of the compensation example is 16.5%, while the reflectance of the embodiment example is 16%. The reflectance of the embodiment example is nearly the same as that of the comparison example; that is, the reflectance of the embodiment example keeps in about 16%. On the other hand, as shown in FIG. 3, for black spectral response, the reflectance of the compensation example is 0.047%, while the reflectance of the embodiment example is 0.078%. The reflectance of the embodiment example is about 40% lower than that of the comparison example. As can be seen from the above, the ratio of the white spectral reflectance to the black spectral reflectance (i.e., contrast ratio) of the embodiment example is about 1.71 times of that of the comparison example. Thus, the contrast ratio of the embodiment example is effectively increased.

Figure 4:
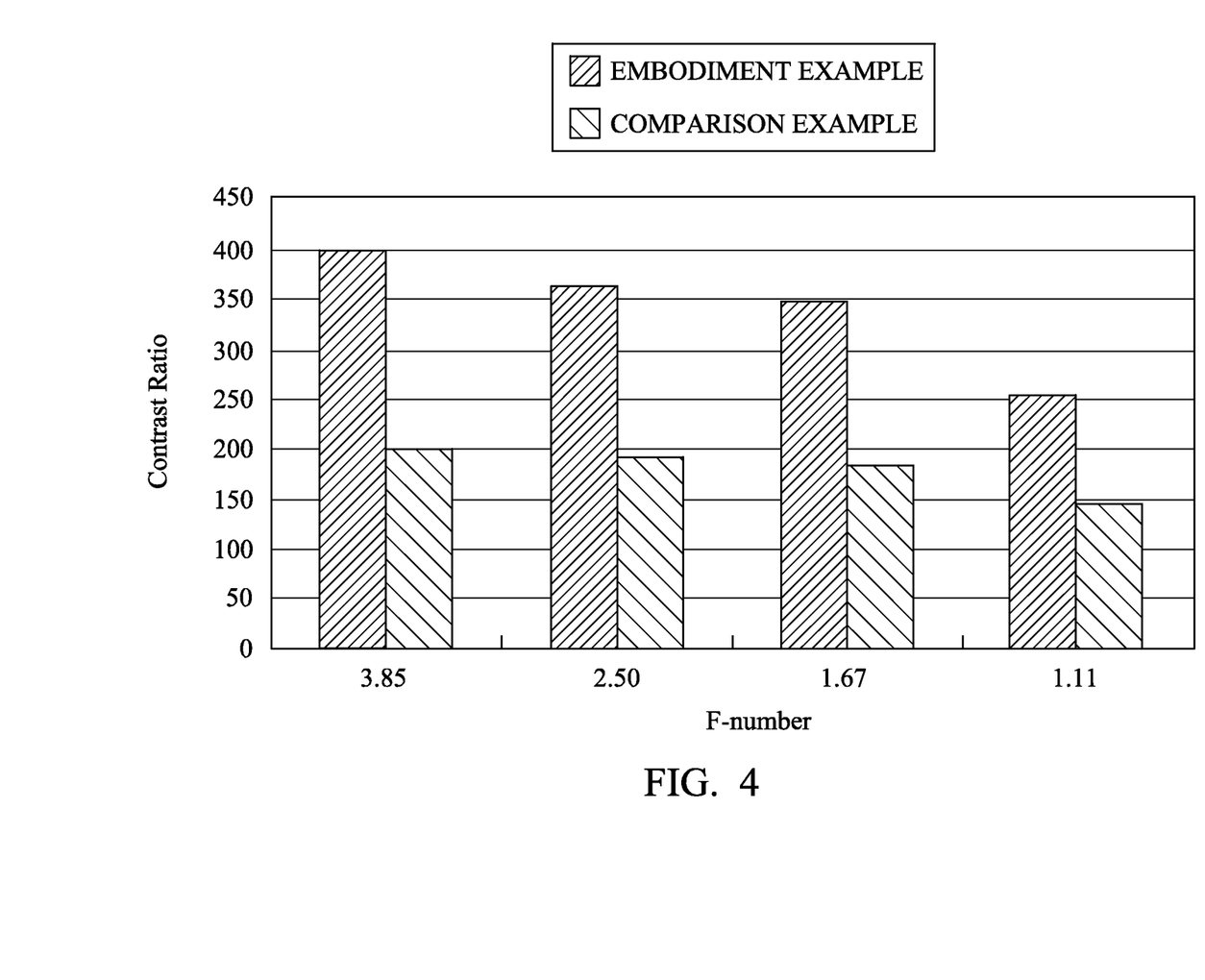
FIG. 4 is a histogram showing the contrast ratio of the embodiment example versus the comparison example.

FIG. 4 is a histogram showing the contrast ratio of the embodiment example versus the comparison example for various F-numbers. The F-number is a magnitude that is given by the ratio of a focal length to the diameter of an entrance pupil (i.e., the aperture) of an optical system. As shown in FIG. 4, for each of the F-numbers of 3.85, 2.50, 1.67 and 1.11, the contrast ratio of the embodiment example is at least 60% higher than that of the comparison example.

From the comparison between the embodiment example and the comparison example as shown in FIGS. 2-4, it can be known that the embodiment example significantly improves the contrast ratio performance and remains the reflectance for white spectral response. Thus, the reflective display apparatus of the invention improves display quality.

Figure 5:
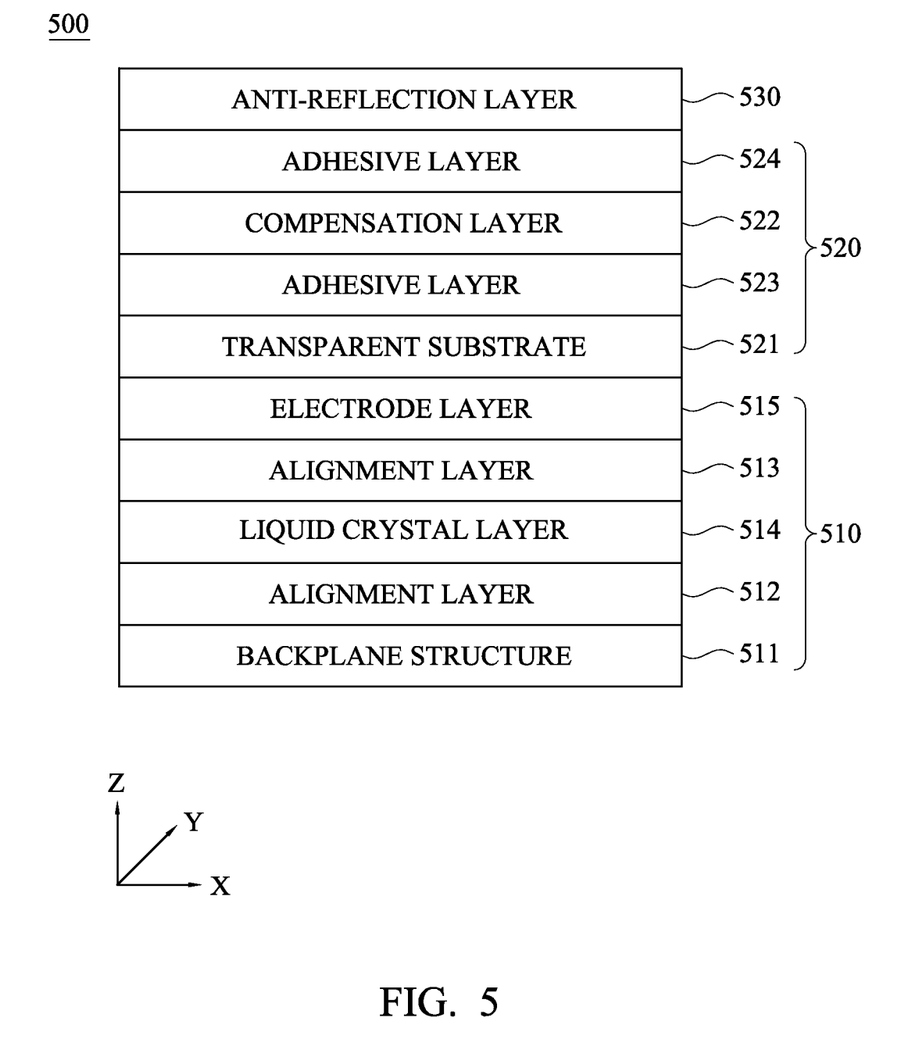
FIG. 5 is a cross-sectional view of a reflective display apparatus in accordance with some embodiments of the invention.

FIG. 5 illustrates a cross-sectional view of a reflective display apparatus 500 in accordance with some embodiments of the invention. The reflective display apparatus 500 is a LCOS display apparatus, which can be practiced by wafer-level manufacturing and includes a LCOS display module 510 and a compensation structure 520. The LCOS display module 510 includes a backplane structure 511, alignment layers 512, 513, a liquid crystal layer 514 and a transparent electrode layer 515. The compensation structure 520 includes a transparent substrate 521, a compensation layer 522 and adhesive layers 523, 524. An anti-reflection layer 530 is disposed on the compensation structure 520 for reducing reflection of light. The LCOS display module 510 and the anti-reflection layer 530 are respectively the same as the LCOS display module 110 and the anti-reflection layer 130 shown in FIG. 1, and thus details of the LCOS display module 510 and the anti-reflection layer 530 are not repeated herein. Compared with the compensation structure 120 shown in FIG. 1, the compensation structure 520 does not include a top transparent substrate, such that the reflective display apparatus 500 is thinned. Similarly, the transparent substrate 521, the compensation layer 522 and adhesive layers 523, 524 are respectively the same as the transparent substrate 121, the compensation layer 122 and adhesive layers 124, 125 shown in FIG. 1, and thus details of the transparent substrate 521, the compensation layer 522 and adhesive layers 523, 524 are not repeated herein. In some embodiments, the compensation layer 522 includes a black matrix disposed thereon for shielding light.

Figure 6:
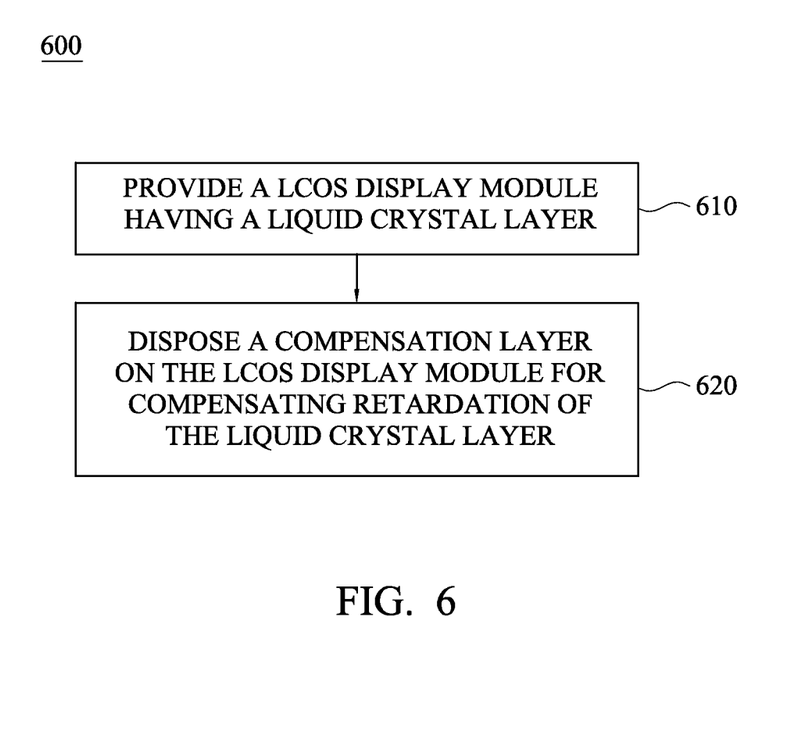
FIG. 6 is a flow chart of a method of forming a reflective display apparatus in accordance with some embodiments of the invention.

FIG. 6 a flow chart of a method 600 of forming a reflective display apparatus in accordance with some embodiments of the invention. The method 600 begins at step 610, in which a LCOS display module is provided. The LCOS display module has a liquid crystal layer, and the liquid crystal layer comprises liquid crystal cells. Each of the liquid crystal cells is a MTN liquid crystal cell and has a beta angle ranging from about 9 degrees to about 11 degrees and a twist angle ranging from about 84 degrees to about 88 degrees relative to the beta angle. In some embodiments, the retardation of the liquid crystal layer is between about 240 nm and about 250 nm.

At step 620, a compensation layer is disposed on the LCOS display module for compensating retardation of the liquid crystal layer. In some embodiments, the compensation layer includes two compensation films. The two compensation films may be two a-plates of which the optical axis direction is parallel to a plane direction of the LCOS display module, and may have different optical characteristics. For example, one may have a slow axis of between about 0 and about 30 degrees, and the other may have a slow axis of between about 90 degrees and about 120 degrees. In some embodiments, the compensation layer has a retardation of between about 25 nm and about 140 nm. Alternatively, the compensation layer may include a single compensation film or more than two compensation films stacked on each other. In some embodiments, the compensation layer may have a black matrix disposed thereon for shielding light.

In some embodiments, before step 620, an adhesive layer is disposed on the LCOS display module, such that the compensation layer is disposed on the LCOS display module via the adhesive layer. The adhesive layer may include a transparent and adhesive material such as optical glue, double sided tape or the like.

In some embodiments, after step 620, a transparent substrate is disposed on the compensation layer. An adhesive layer may be disposed on the compensation layer, such that the transparent substrate is disposed on the compensation layer via the adhesive layer. The transparent substrate may have a black matrix disposed thereon for shielding light. Further, an anti-reflection layer may be disposed on the compensation layer for reducing reflection of light.

In alternative embodiments, after step 620, an anti-reflection layer is disposed on the compensation layer for reducing reflection of light. An adhesive layer may be disposed on the compensation layer, such that the anti-reflection layer is disposed on the compensation layer via the adhesive layer.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A reflective display apparatus, comprising:
   a liquid-crystal-on-silicon (LCOS) display module having a liquid crystal layer, wherein the liquid crystal layer comprises a plurality of liquid crystal cells each having a beta angle ranging from about 9 degrees to about 11 degrees and a twist angle ranging from about 84 degrees to about 88 degrees relative to the beta angle, wherein the beta angle is relative to a planar axis of the LCOS display module; and
   a compensation layer on the LCOS display module for compensating retardation of the liquid crystal layer;
   wherein the compensation layer comprises two compensation films stacked on each other, and wherein one of the compensation films has a slow axis of between about 0 and about 30 degrees, and the other of the compensation films has a slow axis of between about 90 degrees and about 120 degrees.

2. The reflective display apparatus of claim 1, wherein the compensation layer comprises a single compensation film.

3. The reflective display apparatus of claim 1, wherein the compensation layer comprises a black matrix.

4. The reflective display apparatus of claim 1, wherein the compensation layer has a retardation of between about 25 nm and about 140 nm.

5. The reflective display apparatus of claim 1, wherein the retardation of the liquid crystal layer is between about 240 nm and about 250 nm.

6. The reflective display apparatus of claim 1, wherein the liquid crystal cells are mixed-type twisted nematic (MTN) liquid crystal cells.

7. The reflective display apparatus of claim 1, further comprising:
   an anti-reflection layer on the compensation layer.

8. The reflective display apparatus of claim 7, further comprising:
   a transparent substrate between the anti-reflection layer and the compensation layer.

9. The reflective display apparatus of claim 8, wherein the transparent substrate comprises a black matrix.

10. A method of forming a reflective display apparatus, comprising:
    providing a LCOS display module having a liquid crystal layer, wherein the liquid crystal layer comprises a plurality of liquid crystal cells each having a beta angle ranging from about 9 degrees to about 11 degrees and a twist angle ranging from about 84 degrees to about 88 degrees relative to the beta angle, wherein the beta angle is relative to a planar axis of the LCOS display module; and
    disposing a compensation layer on the LCOS display module for compensating retardation of the liquid crystal layer;
    wherein the compensation layer comprises two compensation films stacked on each other, and wherein one of the compensation films has a slow axis of between about 0 and about 30 degrees, and the other of the compensation films has a slow axis of between about 90 degrees and about 120 degrees.

11. The method of claim 10, wherein the compensation layer comprises a single compensation film.

12. The method of claim 10, wherein the compensation layer is disposed on the LCOS display module via an adhesive layer disposed therebetween.

13. The method of claim 10, wherein the compensation layer comprises a black matrix.

14. The method of claim 10, further comprising disposing an anti-reflection layer on the compensation layer, wherein the anti-reflection layer is disposed on the compensation layer via an adhesive layer disposed therebetween.

15. The method of claim 10, further comprising disposing a transparent substrate and an anti-reflection layer sequentially on the compensation layer, wherein the transparent substrate is disposed on the compensation layer via an adhesive layer disposed therebetween.

16. The method of claim 15, wherein the transparent substrate comprises a black matrix.

* * * * *